United States Patent
Inatomi et al.

(10) Patent No.: US 7,241,833 B2
(45) Date of Patent: Jul. 10, 2007

(54) PHENOLIC NOVOLAKS AND PROCESS FOR PRODUCTION THEREOF

(75) Inventors: Shigeki Inatomi, Aichi (JP); Noboru Tanoue, Aichi (JP)

(73) Assignee: Asahi Organic Chemicals Industry Co.., LTP, Nobeoka-shi (JP)

( * ) Notice: Subject to any disclaimer, the term of this patent is extended or adjusted under 35 U.S.C. 154(b) by 187 days.

(21) Appl. No.: 10/494,362

(22) PCT Filed: Nov. 15, 2002

(86) PCT No.: PCT/JP02/11924

§ 371 (c)(1),
(2), (4) Date: Nov. 24, 2004

(87) PCT Pub. No.: WO03/042267

PCT Pub. Date: May 22, 2003

(65) Prior Publication Data

US 2005/0075452 A1    Apr. 7, 2005

(30) Foreign Application Priority Data

Nov. 16, 2001  (JP)  ............... 2001-350949
Oct. 22, 2002  (JP)  ............... 2002-306573

(51) Int. Cl.
| | |
|---|---|
| C08J 3/11 | (2006.01) |
| C08G 8/10 | (2006.01) |
| C08G 8/28 | (2006.01) |
| C08G 14/04 | (2006.01) |
| C08G 14/12 | (2006.01) |

(52) U.S. Cl. ............... 524/541; 524/56; 528/129; 528/141; 528/144; 528/155; 528/398; 528/486; 528/487

(58) Field of Classification Search ............... 524/512, 524/541; 528/129, 141, 144, 155, 398, 486, 528/487

See application file for complete search history.

(56) References Cited

U.S. PATENT DOCUMENTS 5,959,153 A * 9/1999 Kragten et al. ............ 568/342

FOREIGN PATENT DOCUMENTS

| JP | 62-119220 | 5/1987 |
|---|---|---|
| JP | 63-275620 | 11/1988 |
| JP | 2-70717 | 3/1990 |
| JP | 6-49159 | 2/1994 |
| JP | 10-158352 | 6/1998 |
| JP | 2001-172348 | 6/2001 |
| JP | 2002-105157 | 4/2002 |
| JP | 2002-128849 | 5/2002 |
| JP | 2002-194041 | 7/2002 |
| JP | 2002-249532 | 9/2002 |

* cited by examiner

*Primary Examiner*—Duc Truong
(74) *Attorney, Agent, or Firm*—Armstrong, Kratz, Quintos, Hanson & Brooks, LLP.

(57) ABSTRACT

A process for production of phenolic novolak which comprises the step of conducting heterogeneous reaction of a phenol with 0.40 to 0.93 mol of an aldehyde per mol of the phenol in the presence of at least 25 parts by mass of a phosphoric acid per 100 parts by mass of the phenol. This process can give in high yield phenolic novolak with the contents of monomeric and dimeric phenols and a degree of dispersion controlled.

3 Claims, 5 Drawing Sheets

PHENOLIC NOVOLAKS AND PROCESS FOR PRODUCTION THEREOF

TECHNICAL FIELD

The present invention relates to phenolic novolak and a process for production thereof, and more particularly to phenolic novolak having the contents of a monomeric phenol and a dimeric phenol and a degree of dispersion (Mw/Mn) controlled and a production process capable-of producing such a resin in high yield.

BACKGROUND ART

Conventionally, the phenolic novolak is generally produced by switching from a homogeneous reaction of a phenol and an aldehyde in the presence of an acid catalyst to a heterogeneous reaction starting from an emulsification phenomenon, further pursuing the reaction, checking the production of an initial condensate having a desired degree of condensation before terminating the condensation reaction, and conducting the reduction of low-molecular-weight components and dehydration in the initial condensate by vacuum concentration. And, the phenolic novolak has relatively favorable electric properties and also excels in heat resistance and flame retardance. Therefore, it is extensively used as a base resin for production of an epoxy resin which is used for, for example, electric and electronic materials, semiconductor sealers and the like required to have remarkable electric properties or a curing agent for epoxy resins and also used as a binder for laminated plates, forming materials, mold materials, and the like.

But, when the conventional phenolic novolak was used for the electric and electronic materials, semiconductor sealers or the like, the resin contained a monomeric phenol and a dimeric phenol in a large amount, so that there were various problems resulting from the monomeric phenol such as environmental pollution because of volatilization of the monomeric phenol involving an odor, a degradation in production efficiency because of falling of the dimeric phenol, which were sublimated to deposit on the side and ceiling of the apparatus when a photoresist coated on a substrate such as glass for liquid crystal display was baked, onto the substrate, and a degradation in crosslinking density of a cured resin substance affecting on the heat resistance, and the like. Because the molecular weight distribution was broad, there were also disadvantages that the molten resin had a high viscosity and poor moldability.

Where the phenolic novolak is used as a binder for castings, it is demanded to decrease phenol monomer contained in the phenolic resin as low as possible because the phenol monomer applies to the PRTR method (Pollutant Release and Transfer Register) and the phenol monomer contained in the binder becomes rosin in a high-temperature atmosphere, resulting in defective casting such as a gas defect. In other words, as the phenolic resin for the casting binder, a phenolic novolak having properties that a content of monomeric phenol is decreased, a molecular weight is low and the molecular weight distribution is narrow is demanded.

For example, as a method for reduction of the monomeric phenol and dimeric phenol contained in the above phenolic resin, there is proposed a method of removing low-molecular weight components by blowing in inert gas or vapor to condense a novolak-based condensate at 150° C. to 210° C. after the condensation reaction is completed (Japanese Patent Publication No. Hei 7-91352). This method has a reliable effect of decreasing the monomeric phenol and dimeric phenol but has a disadvantage that their removal lowers the yield of the resin.

The present invention has been made in view of the above circumstances and provides phenolic novolak with the contents of a monomeric phenol and a dimeric phenol and a degree of dispersion (Mw/Mn) controlled.

Specifically, the invention provides phenolic novolak which is free from environmental pollution by a monomeric phenol and a dimeric phenol, inhibition of productivity in a photoresist baking step or a decrease in crosslinking density of a cured resin substance and can have the viscosity of the molten resin lowered, and phenolic novolak which has a small amount of monomeric phenol, a large amount of dimeric phenol, a low molecular weight and a narrow molecular weight distribution.

The present invention also provides a process for production capable of producing the above-described resin in high yield.

SUMMARY OF THE INVENTION

The process for production of phenolic novolak of the present invention comprises a step of conducting a heterogeneous reaction of a phenol with 0.40 to 0.93 mol of an aldehyde per mol of the phenol in the presence of at least 25 parts by mass of a phosphoric acid per 100 parts by mass of the phenol. According to the process for production of the present invention, the phenolic novolak with the contents and a degree of dispersion of a monomeric phenol and a dimeric phenol controlled can be obtained in high yield, and the production cost can be reduced considerably.

In the process for production of the phenolic novolak of the present invention, when the compounding amount of an aldehyde is in a range of 0.80 mol or more and 0.93 mol or less per mol of a phenol, a first phenolic novolak of the present invention can be produced in high yield. When the compounding amount of the aldehyde is in a range of 0.40 mol or more and less than 0.80 mol per mol of the phenol, a second phenolic novolak of the present invention can be produced in high yield.

Then, the first phenolic novolak of the present invention has a total content of a monomeric phenol and a dimeric phenol in 10% or less, preferably 5% or less, when measured by the area method of gel filtration chromatography, and a degree of dispersion (Mw/Mn) of a weight-average molecular weight (Mw) and a number-average molecular weight (Mn) in 1.1 to 3.0 according to the measurement by gel filtration chromatography.

The first phenolic novolak of the invention has an extremely small amount of a monomeric phenol as compared with conventional resins and also a considerably decreased amount of a dimeric phenol, so that problems such as contamination of work environment and degradation in production efficiency in the photoresist field can be improved. And, heat resistance, mechanical strength and the like can be improved without impairing formability, flowability or the like because a crosslinking density substantially same as that of a conventional high-molecular weight resin and a melt viscosity substantially same as that of a conventional low-molecular weight resin can be expressed.

The second phenolic novolak of the invention has a content of a monomeric phenol in 3% or less and a content of a dimeric phenol in 10% to 75%, preferably 20% to 60%, when measured by the area method of gel filtration chromatography, and a weight-average molecular weight (Mw)

in 300 to 1000 and a degree of dispersion (Mw/Mn) of a weight-average molecular weight (Mw) and a number-average molecular weight (Mn) in 1.1 to 1.8 according to the measurement by gel filtration chromatography.

The second phenolic novolak of the invention has a very small amount of a monomeric phenol as compared with a conventional resin, so that problems of production efficiency such as pollution of work environment can be improved. And, the obtained resin has a narrow molecular weight distribution and a low melt viscosity, so that it is suitably used as a base resin for epoxy resins, a curing agent for epoxy resins and also as a binder for laminated plates, casting materials, forming materials and the like.

BEST MODE FOR CARRYING OUT THE INVENTION

[Process for Production of Novolak Resin]

A process for production of the novolak resin according to the invention requires a phenol and an aldehyde as raw materials and phosphoric acid as an acid catalyst, stirs them in a two-phase separated state by mechanical stirring and pursues a reaction between the phenol and the aldehyde in a cloudy heterogeneous reaction system with two phases (organic phase and water phase) mixed to synthesize a condensate (resin). Then, for example, a water-insoluble organic solvent (e.g., methyl ethyl ketone, methyl isobutyl ketone or the like) is added and mixed to dissolve the condensate, the stirring for mixing is stopped, and the mixture is left standing to separate into the organic phase (organic solvent phase) and the water phase (aqueous phosphoric acid solution phase). Then, the water phase is removed for recovering, while the organic phase is washed with hot water and/or neutralized, and the organic solvent is recovered by distillation, thereby producing the novolak resin.

The process for production according to the invention employs a phase separation reaction, so that stirring efficiency is quite important, and it is desirable to miniaturize both phases in the reaction system to increase the surface area of the interface as large as possible in view of the reaction efficiency. Thus, when a compounding mole ratio (F/P) of the aldehyde (F) and the phenol (P) is in a range of 0.80 or more and 0.93 or less, the conversion of the monomeric phenol and the dimeric phenol into the resin is promoted, and when the compounding mole ratio (F/P) is in a range of 0.40 or more and less than 0.80, the conversion of the monomeric phenol into the resin is promoted.

As the phenol used as the raw material, for example, phenol, cresol, xylenol, butylphenol, phenylphenol, and the like are cited. Meanwhile, as the aldehyde, for example, formaldehyde, formalin, paraformaldehyde, acetaldehyde and the like are cited. Those raw materials are not limited to the exemplified ones and can be used alone or as a combination of two or more of them.

A compounding mole ratio (F/P) of the aldehyde (F) and the phenol (P) is 0.40 to 0.93, preferably 0.70 to 0.90. When it is less than 0.40, the effect of improving the yield is degraded, and when it exceeds 0.93, the molecular weight distribution tends to have a large width. Here, when the compounding mole ratio (F/P) is in a range of 0.80 or more and 0.93 or less, preferably 0.82 or more and 0.90 or less, the first novolak resin of the invention can be produced in high yield. And, when the compounding mole ratio (F/P) is in a range of 0.40 or more and less than 0.80, preferably 0.70 or more and 0.78 or less, the second novolak resin of the invention can be produced in high yield.

The phosphoric acid used as the acid catalyst plays an important role to form a place for a phase separation reaction with the phenol in the presence of water. Preferably, an aqueous solution type, e.g., 89% by mass phosphoric acid or 75% by mass phosphoric acid, is used but, for example, polyphosphoric acid or anhydrous phosphoric acid may be used if necessary.

The compounding amount of the phosphoric acid has a considerable effect on the control of the phase separation effect and is 25 parts by mass or more, preferably 40 parts by mass or more, and more preferably 50 parts by mass or more to 100 parts by mass of the phenol. When the compounding amount is less than 25 parts by mass and the compounding mole ratio (F/P) is in a range of 0.80 or more and 0.93 or less, the molecular weight distribution tends to have a large width, and when the compounding mole ratio (F/P) is in a range of 0.40 or more and less than 0.80, there is a tendency that a reaction acceleration effect is not produced. Where 70 parts by mass or more of phosphoric acid is used, it is desirable to secure safety by divided addition to the reaction system to suppress heat generation in the early stage of reaction.

An amount of water in the reaction system affects on the phase separation effect and the production efficiency but is generally 40% or less in mass standard. When the amount of water exceeds 40%, there is a possibility that the production efficiency lowers.

A reaction temperature of the phenol and the aldehyde is significant to enhance the phase separation effect and generally 40° C. to a reflux temperature, preferably 80° C. to a reflux temperature, and more preferably a reflux temperature. When the reaction temperature is less than 40° C., the reaction time becomes very long, and when the compounding mole ratio (F/P) is in a range of 0.80 or more and 0.93 or less, it is hard to reduce the monomeric phenol and the dimeric phenols, and when the compounding mole ratio (F/P) is in a range of 0.40 or more and less than 0.80, it is hard to reduce the monomeric phenol. The reaction time is variable depending on the reaction temperature, the compounding amount of phosphoric acid, the water content in the reaction system or the like but generally in a rang of approximately 1 to 10 hours. As a reaction environment, normal pressure is suitable, but the reaction may be conducted under pressure or under reduced pressure to maintain a heterogeneous reaction which is a feature of the invention.

It is not necessarily clear why the novolak resin is obtained in good yield with the contents of the monomeric phenol and dimeric phenol and the degree of dispersion (Mw/Mn) controlled according to the process of the invention but it is presumed as follows.

In the heterogeneous reaction system in a whitish state that the organic phase having the phenol as the main ingredient and the water phase having the phosphoric acid and the aldehyde as the main ingredients are mixed, the phenol in the organic phase dissolves into the water phase and reacts with the aldehyde under the catalyzing conditions of the phosphoric acid to grow as a condensate (resin), which cannot coexist in the water phase and moves to the organic phase having the condensate dissolving power, and the further growth of the condensate is suppressed or stopped, so that it is prevented from being of high molecular weight. Thus, the process of the invention applies a two-liquid phase interface reaction having a mechanism of suppressing the resinification of the phenol in the water phase and the resin from being of high molecular weight in the organic phase, so that it is assumed that the resin having the contents of the monomeric phenol and dimeric phenol and a degree of dispersion (Mw/Mn) controlled is produced at the end of the condensation reaction, and the yield is considerably improved.

Therefore, when the compounding mole ratio (F/P) is in a range of 0.80 or more and 0.93 or less and the compounding mole ratio (F/P) becomes small, the growth of the condensate in the water phase is suppressed. Thus, the dimeric phenol will not be reduced easily, and when the mole ratio becomes large conversely, the condensate in the water phase is promoted to be of high molecular weight, so that the dimeric phenol comes to be reduced easily.

When the compounding mole ratio (F/P) is in a range of 0.40 or more and less than 0.80, the compounding mole ratio (F/P) is in a relatively low range. In this range, the growth of the condensate in the water phase is suppressed, so that the dimeric phenol is hardly consumed. Therefore, considering that the yield is large, there is developed a feature that the final product dimeric phenol is large in amount as compared with the conventional formula.

It is considered from the above that the setting of the compounding ratio of the reaction raw materials and the phosphoric acid amount is most significant but water and reaction temperatures essential for the phase separation related to the above are also important to efficiently develop the phase separation effect of the process according to the invention. In other words, the process according to the invention is presumed that the novolak resin having the contents of the monomeric phenol and the dimeric phenol and the degree of dispersion (Mw/Mn) controlled by setting the appropriate reaction conditions according to the above-described presumed reasons can be produced in high yield.

[First Novolak Resin]

The first novolak resin of the invention has a total content of a monomeric phenol and a dimeric phenol in 10% or less, preferably 5% or less, according to the measurement made by the GPC area method. When the total content of the monomeric phenol and the dimeric phenol is 10% or less, the various disadvantages of the conventional resins, especially the disadvantages resulting from the dimeric phenol, can be remedied.

And, the degree of dispersion (Mw/Mn) of the weight-average molecular weight (Mw) and the number-average molecular weight (Mn) is 1.1 to 3.0, preferably 1.5 to 2.0, according to GPC measurement. It indicates that the smaller the numeral of the degree of dispersion (Mw/Mn), the smaller the width of the molecular weight distribution of the resin. When this degree of dispersion is 1.1 or more, the content of the dimeric phenol decreases, and when it is 3.0 or less, the molecular weight becomes suitable for the synthesis of the resin.

The weight-average molecular weight (Mw) is preferably 800 to 3700, and more preferably 900 to 3500. When the Mw is 800 or more, a softening point is suitable without causing consolidation, and when it is 3700 or less, flowability is outstanding.

The process for production of the first novolak resin of the invention is not limited particularly, but it can be produced in high yield by the process for production according to the invention where the compounding mole ratio (F/P) is 0.80 or more and 0.93 or less.

[Second Novolak Resin]

The second novolak resin of the invention has a monomeric phenol content of 3% or less, preferably 1% or less, and a dimeric phenol content of 10% to 75%, preferably 20% to 60% when measured by the GPC area method. When the monomeric phenol content is 3% or less, a work environment problem and also various problems resulting from the monomeric phenol can be solved. And, when the dimeric phenol content is 10% or more, the resin has outstanding flowability and, when it is 75% or less, it has remarkable heat resistance.

According to the GPC measurement, the weight-average molecular weight (Mw) is 300 to 1000, preferably 330 to 900, and the degree of dispersion (Mw/Mn) of the weight-average molecular weight (Mw) and the number-average molecular weight (Mn) is 1.1 to 1.8, preferably 1.2 to 1.7. When the Mw is 300 or more, heat resistance is outstanding and, when it is 1000 or less, the flowability is outstanding. And, the degree of dispersion (Mw/Mn) is hardly determined to be less than 1.1 becoming closer to monodispersion in view of polymolecularity inherent in the resin, and when it is 1.8 or less, its flowability is outstanding.

The process for production of the second novolak resin of the invention is not particularly limited but can produce it in high yield at the compounding mole ratio (F/P) of 0.40 or more and less than 0.80.

EXAMPLES

The present invention will be described in further detail with reference to examples but not limited to such examples. The properties of the produced novolak resin were measured by the following testing methods.

(1) Degree of Dispersion

Weight-average molecular weight (Mw) and number-average molecular weight (Mn) in terms of the standard polystyrene calibration were determined by Tosoh Corporation's gel filtration chromatography 8020 series build-up system (column: $G2000H_{XL}+G4000H_{XL}$, detector: UV 254 nm, carrier: tetrahydrofuran 1 ml/min, column temperature: 38° C.), and a degree of dispersion (Mw/Mn) was calculated.

(2) Contents (%) of Monomeric Phenol and Dimeric Phenol

Areas of a monomeric phenol and a dimeric phenol to the entire area of the molecular weight distribution were measured by an area method indicating in percentage.

(3) Softening Point (° C.)

According to the Ring-and-Ball method described in JIS-K6910, a ring-and-ball type automatic softening point measuring apparatus ASP-MGK2 produced by MEITECH Company, Ltd. was used for measurement.

Example 1

Into a reaction vessel provided with a thermometer, a stirring device and a reflux condenser, 193 g of phenol (P), 142 g of 37% by mass formalin (F) (F/P=0.85) and 116 g of 89% by mass phosphoric acid (53.4%/P) were charged. They were stirred for mixing to have a whitish state (two-phase mixture), the whitish mixture was gradually raised to a reflux temperature (98 to 102° C.). At the same temperature, a condensation reaction was conducted for six hours, and a small amount of sample was collected from the produced condensate.

Then, methyl isobutyl ketone was added to dissolve the condensate while stirring for mixing, the stirring for mixing was stopped, the content was moved into a separating flask and left standing to separate into a methyl isobutyl ketone solution phase (upper phase) and an aqueous phosphoric acid solution phase (lower phase). Then, the aqueous phosphoric acid solution phase was removed, the methyl isobutyl ketone solution was washed with water several times to remove phosphoric acid, the content was returned into the reaction vessel, and the methyl isobutyl ketone was completely removed by vacuum distillation to obtain 212 g of the novolak resin (yield 110%/P). The yield of the novolak resin was indicated in percentage to the charged amount of phenol (mass standard).

Figure 1:
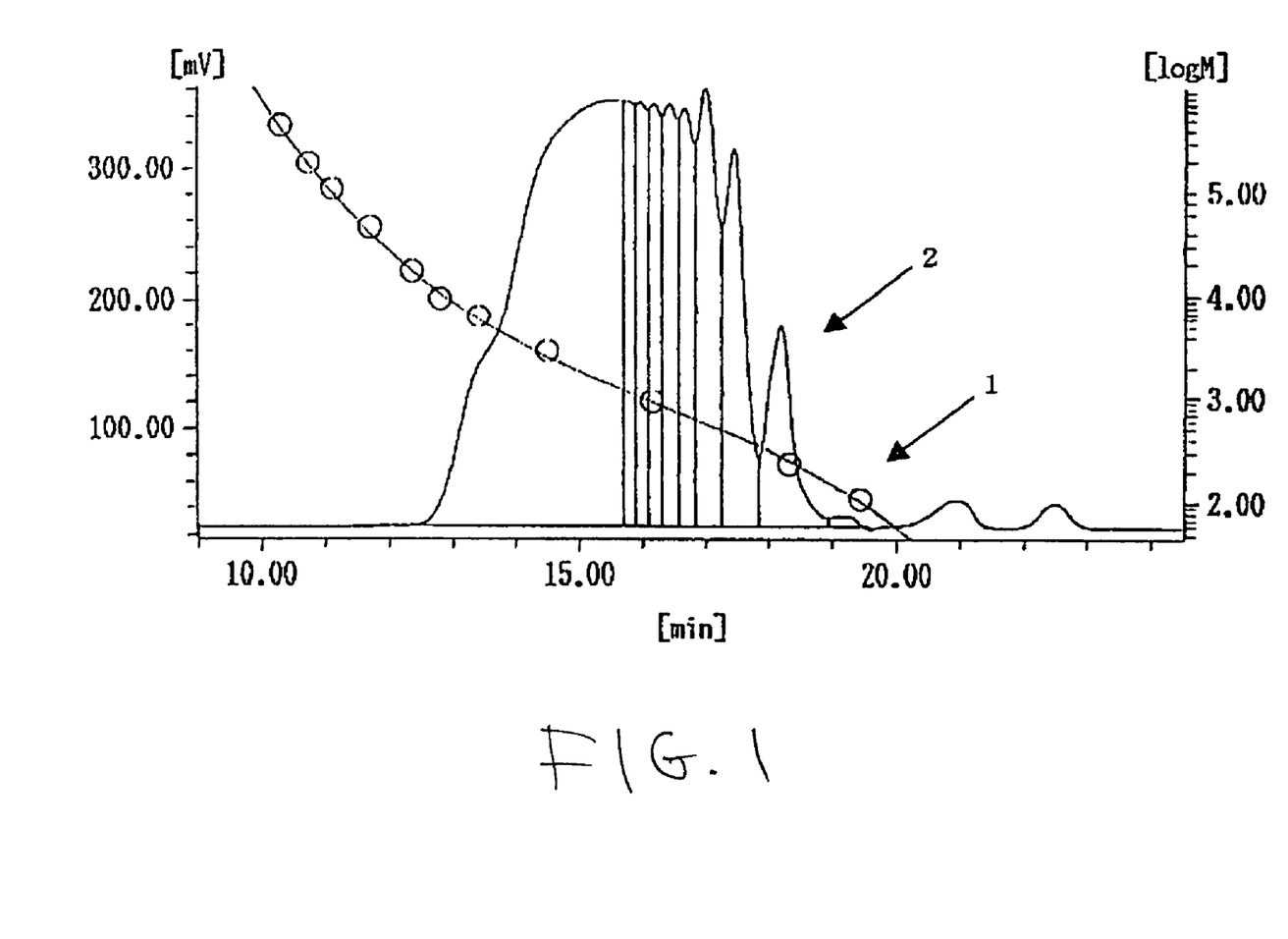
FIG. 1 is a chart of the gel filtration chromatography (hereinafter referred to as the "GPC") as one example (Example 1) of the first phenolic novolak (hereinafter referred to as the "novolak resin")

The obtained novolak resin were measured for its properties according to the testing method described above. The results are shown in Table 1. A GPC chart of the obtained novolak resin is shown in FIG. 1.

Examples 2 to 6

Novolak resins were obtained in the same manner as in Example 1 and measured in the same way except that the compositions were changed as shown in Table 1. The results are shown in Table 1. In Table 1, "N.D." indicates no detection.

TABLE 1

|  |  | Example 1 | Example 2 | Example 3 | Example 4 | Example 5 | Example 6 |
|---|---|---|---|---|---|---|---|
| Composition (Mass standards) | Phenol | 193 | 193 | 193 | 193 | — | — |
|  | o-Cresol | — | — | — | — | 193 | — |
|  | m-Cresol | — | — | — | — | — | 193 |
|  | 37% by mass formalin | 142 | 142 | 133 | 150 | 123 | 123 |
|  | 89% by mass phosphoric acid | 116 | 155 | 405 | 155 | 116 | 116 |
|  | Oxalic acid | — | — | — | — | — | — |
|  | F/P (mole ratio) | 0.85 | 0.85 | 0.825 | 0.90 | 0.85 | 0.85 |
|  | Phosphoric acid compounding amount (%/P) | 53.4 | 71.5 | 187 | 71.5 | 53.4 | 53.4 |
| Properties of novolak resin | Number-average molecular weight (Mn) | 741 | 866 | 656 | 1153 | 865 | 706 |
|  | Weight-average molecular weight (Mw) | 1469 | 1545 | 961 | 3487 | 1328 | 1238 |
|  | Degree of dispersion (Mw/Mn) | 2.0 | 1.8 | 1.5 | 3.0 | 1.5 | 1.7 |
|  | Monomeric phenol (%) | 0.3 | 0.4 | 0.4 | N.D. | N.D. | 0.3 |
|  | Dimeric phenol (%) | 5.5 | 4.4 | 4.0 | 3.4 | 7.9 | 9.0 |
|  | Softening point (° C.) | 106 | 106 | 98 | 128 | 94.2 | 132 |
|  | Yield (%/P) | 110 | 106 | 110 | 109 | 107 | 106 |

Examples 7 to 11

Figure 2:
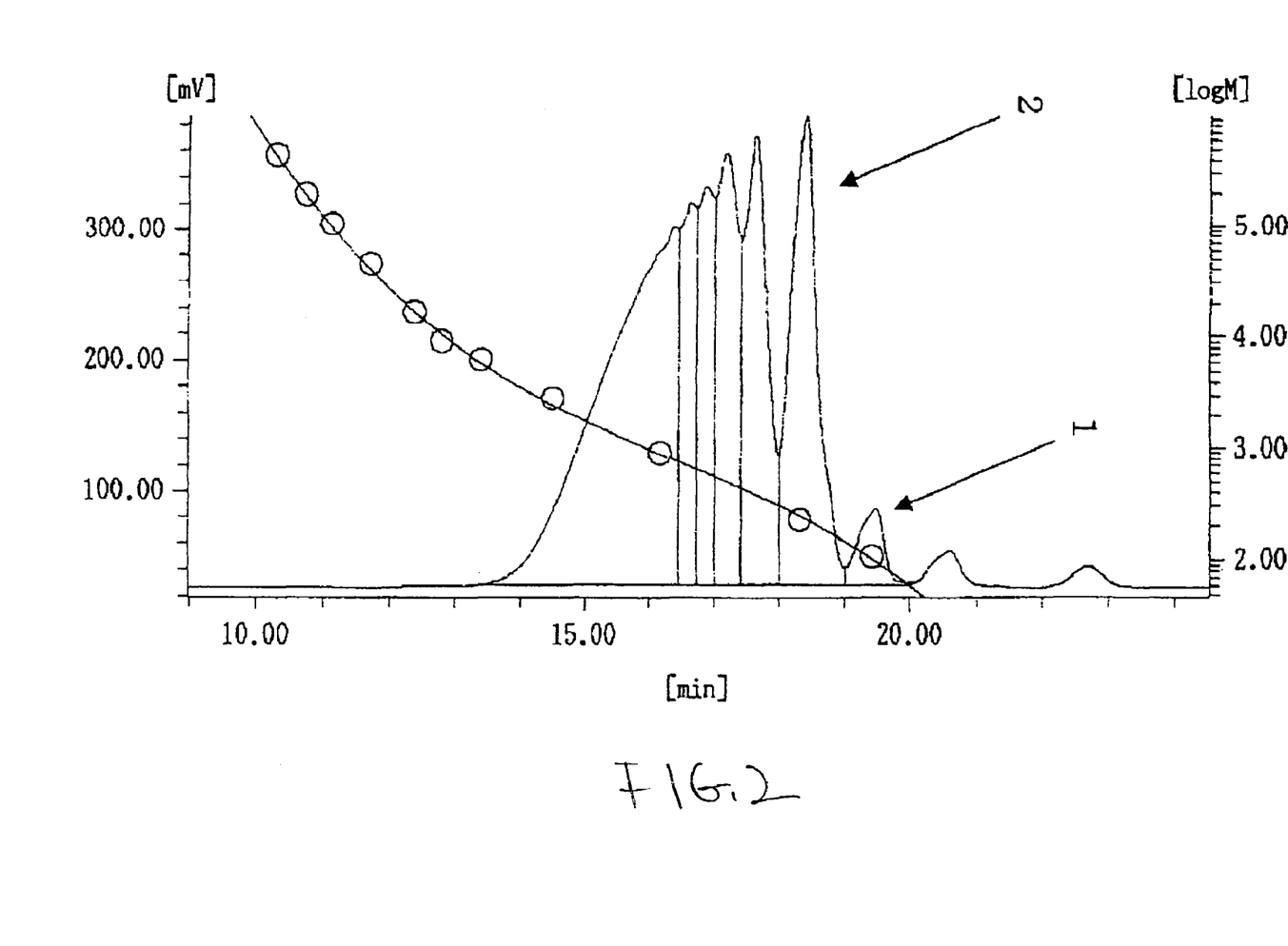
FIG. 2 is a GPC chart of one example (Example 7) of the second novolak resin of the invention.
Figure 3:
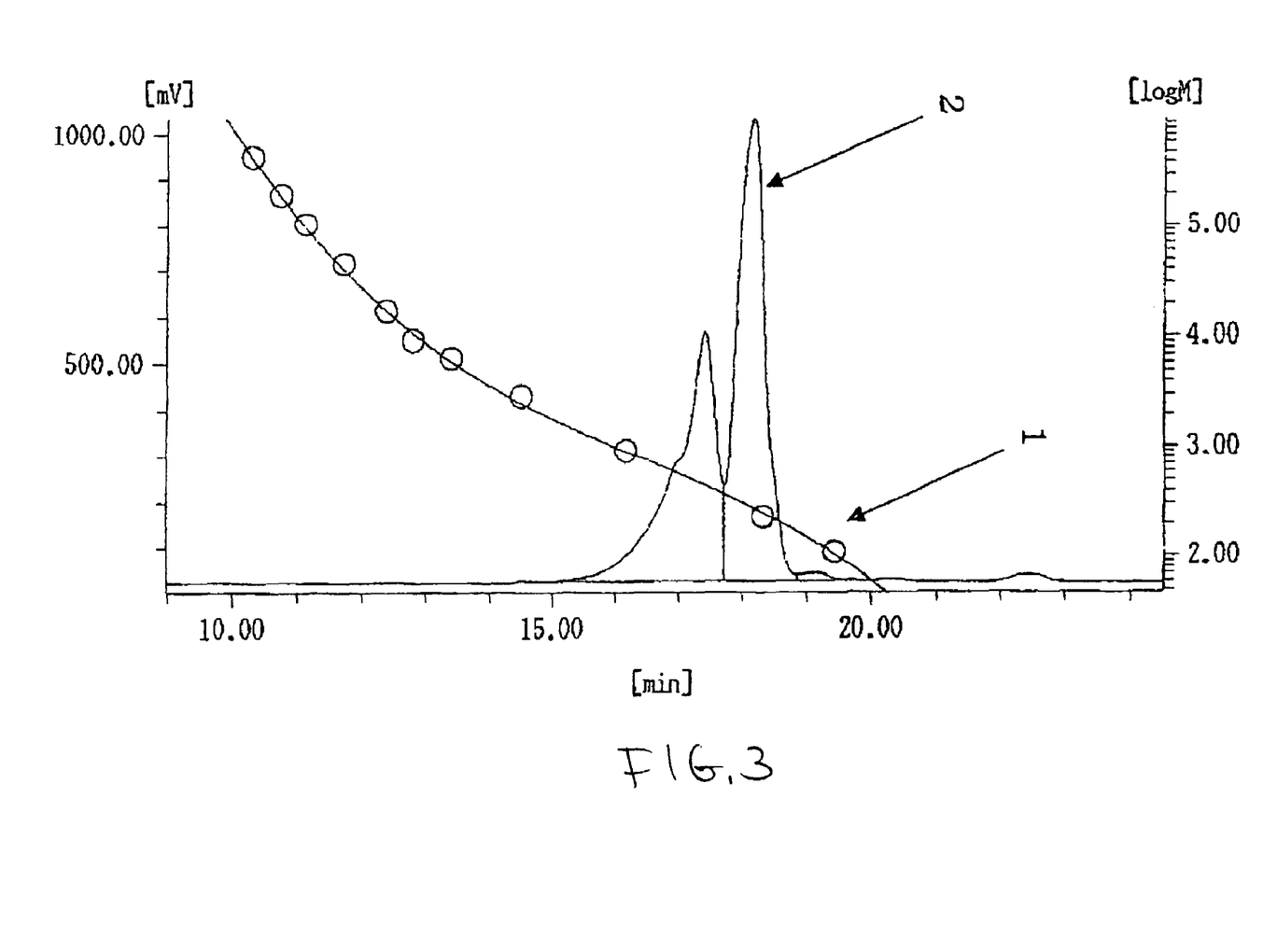
FIG. 3 is a GPC chart of one example (Example 9) of the second novolak resin of the invention.

Novolak resins were obtained in the same manner as in Example 1 and measured in the same way except that the compositions were changed as shown in Table 2. The results are shown in Table 2. In Table 2, "N.D." indicates no detection. GPC charts of the novolak resins obtained in Examples 7 and 9 are shown in FIG. 2 and FIG. 3.

TABLE 2

|  |  | Example 7 | Example 8 | Example 9 | Example 10 | Example 11 |
|---|---|---|---|---|---|---|
| Composition (Mass standards) | Phenol | 193 | 193 | 193 | 193 | — |
|  | o-Cresol | — | — | — | — | 199 |
|  | m-Cresol | — | — | — | — | — |
|  | 37% by mass formalin | 130 | 100 | 83 | 75 | 90 |
|  | 89% by mass phosphoric acid | 116 | 116 | 116 | 116 | 120 |
|  | Oxalic acid | — | — | — | — | — |

TABLE 2-continued

|  |  | Example 7 | Example 8 | Example 9 | Example 10 | Example 11 |
|---|---|---|---|---|---|---|
|  | F/P (mole ratio) | 0.78 | 0.60 | 0.50 | 0.45 | 0.60 |
|  | Phosphoric acid compounding amount (%/P) | 53.4 | 53.4 | 53.4 | 53.4 | 53.4 |
| Properties of novolak resin | Number-average molecular weight (Mn) | 566 | 331 | 287 | 355 | 439 |
|  | Weight-average molecular weight (Mw) | 906 | 417 | 340 | 395 | 539 |
|  | Degree of dispersion (Mw/Mn) | 1.6 | 1.3 | 1.2 | 1.11 | 1.2 |
|  | Monomeric phenol (%) | 0.2 | 1.2 | 1.0 | N.D. | N.D. |
|  | Dimeric phenol (%) | 12.2 | 42.4 | 55.6 | 68.6 | 45.4 |
|  | Softening point (° C.) | 89.1 | 50.1 | 42.1 | Liquid at room temp. | 44.3 |
|  | Yield (%/P) | 109 | 103 | 91 | 84 | 105 |

Comparative Examples 1 to 4

Novolak resins were obtained in the same manner as in Example 1 and measured in the same way except that the compositions were changed as shown in Table 3. The results are shown in Table 3. In Table 3, "N.D." indicates no detection.

TABLE 3

|  |  | Comp. Exam. 1 | Comp Exam. 2 | Comp. Exam. 3 | Comp. Exam. 4 |
|---|---|---|---|---|---|
| Compound (Mass standards) | Phenol | 193 | 193 | 193 | 193 |
|  | o-Cresol | — | — | — | — |
|  | m-Cresol | — | — | — | — |
|  | 37% by mass formalin | 158 | 100 | 142 | 58 |
|  | 89% by mass phosphoric acid | 116 | 19 | 19 | 116 |
|  | Oxalic acid | — | — | — | — |
|  | F/P (mole ratio) | 0.95 | 0.60 | 0.85 | 0.35 |
|  | Phosphoric acid compounding amount (%/P) | 53.4 | 8.8 | 8.8 | 53.4 |
| Properties of novolak resin | Number-average molecular weight (Mn) | 1660 | 517 | 916 | 342 |
|  | Weight-average molecular weight (Mw) | 28012 | 765 | 3345 | 372 |
|  | Degree of dispersion (Mw/Mn) | 16.9 | 1.5 | 3.66 | 1.09 |
|  | Monomeric phenol (%) | N.D. | N.D. | 1.2 | N.D. |
|  | Dimeric phenol (%) | 1.5 | 25.6 | 11.4 | 74.2 |
|  | Softening point (° C.) | 150 | 72.3 | 108.2 | Liquid at room temp. |
|  | Yield (%/P) | 112 | 88 | 96 | 67 |

Comparative Example 5

Into a reaction vessel provided with a thermometer, a stirring device and a condenser, 193 g of phenol (P), 142 g of 37% by mass formalin (F) (F/P=0.85) and 0.97 g of oxalic acid (0.5%/P) were charged and gradually raised to a reflux temperature (98 to 102° C.). At the same temperature, a condensation reaction was conducted for six hours, and concentration was conducted under a reduced pressure to obtain 199 g of a novolak resin (yield 103%/P). The obtained novolak resin was measured in the same manner as in Example 1. The results are shown in Table 4.

Comparative Examples 6, 7

Figure 4:
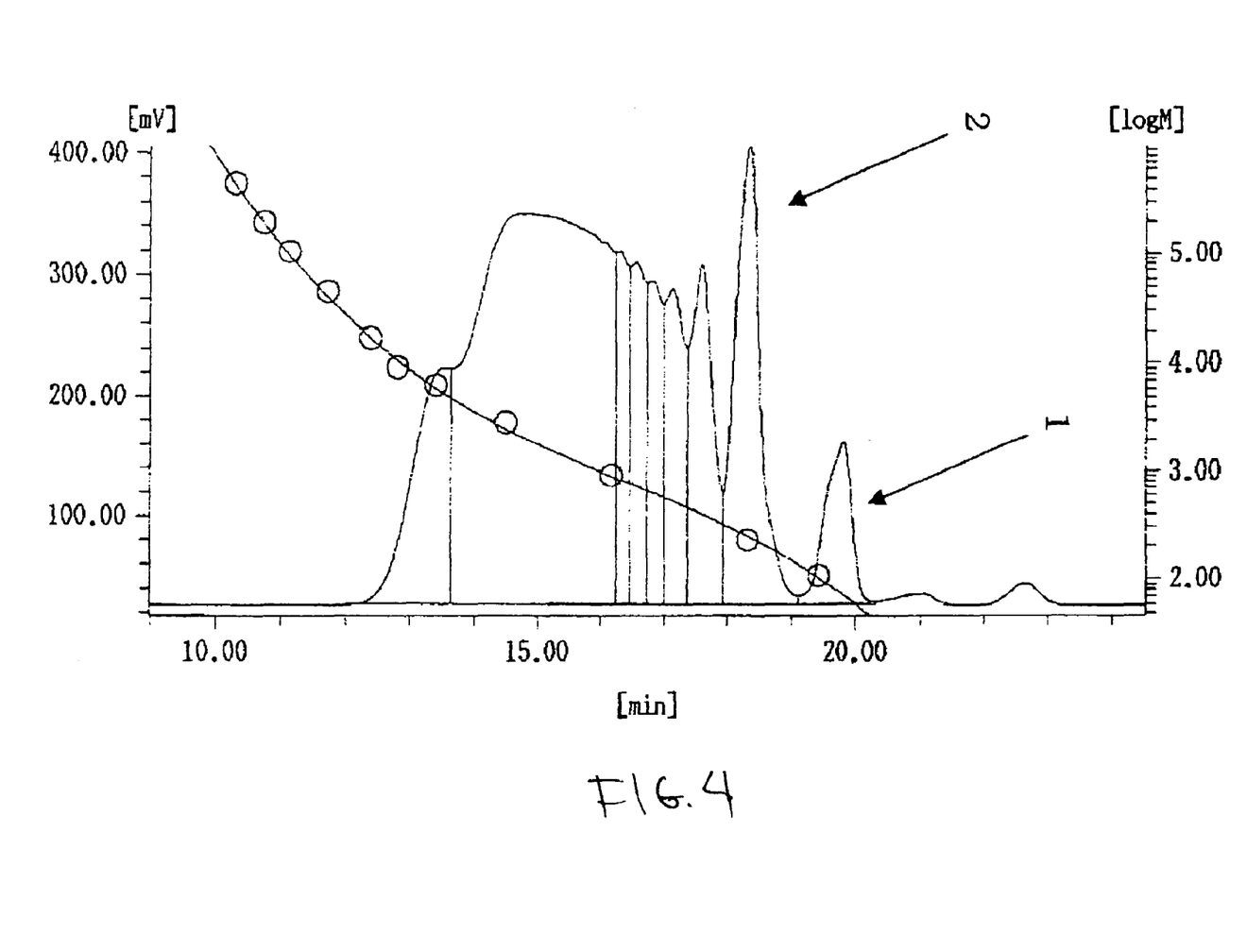
FIG. 4 is a GPC chart of the novolak resin of Comparative Example 6.
Figure 5:
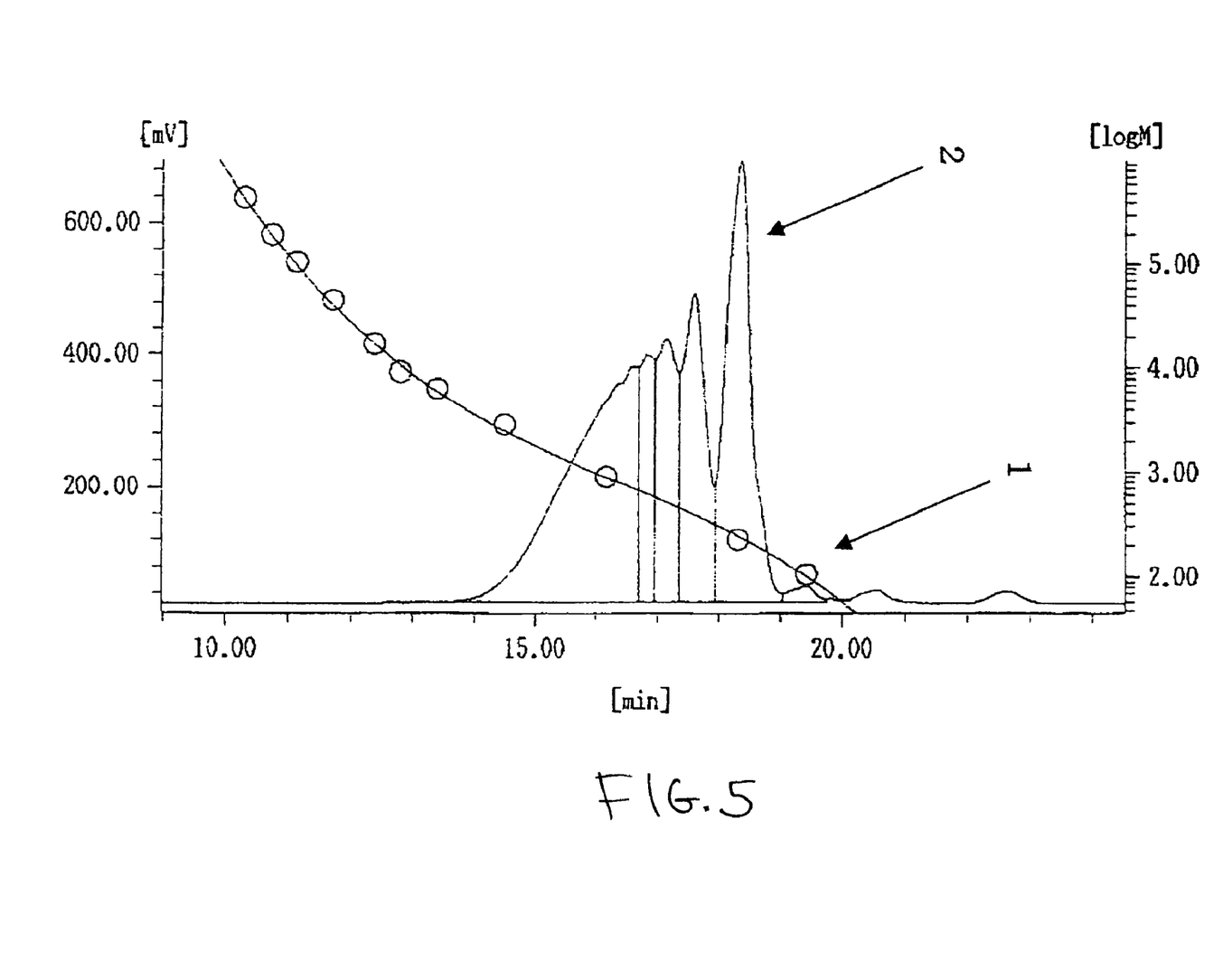
FIG. 5 is a GPC chart of the novolak resin of Comparative Example 7. In the drawings, 1 denotes a peak corresponding to a monomeric phenol and 2 denotes a peak corresponding to a dimeric phenol.

Novolak resins were obtained in the same manner as in Comparative Example 5 and measured in the same manner except that the compounds were changed as shown in Table 3. The results are shown in Table 4. GPC charts of the obtained novolak resins are shown in FIG. 4 and FIG. 5.

TABLE 4

|  |  | Comp. Exam. 5 | Comp. Exam. 6 | Comp. Exam. 7 |
|---|---|---|---|---|
| Compound (Mass Standard) | Phenol | 193 | 193 | 193 |
|  | o-Cresol | — | — | — |
|  | m-Cresol | — | — | — |
|  | 37% by mass formalin | 142 | 130 | 83 |
|  | 89% by mass phosphoric acid | — | — | — |
|  | Oxalic acid | 0.97 | 0.97 | 0.97 |
|  | F/P (mole ratio) | 0.85 | 0.78 | 0.50 |
|  | Phosphoric acid compounding amount (%/P) | — | — | — |
| Properties of novolak resin | Number-average molecular weight (Mn) | 837 | 673 | 432 |
|  | Weight-average molecular weight (Mw) | 4287 | 2165 | 651 |
|  | Degree of dispersion (Mw/Mn) | 5.1 | 3.2 | 1.5 |

TABLE 4-continued

|  | Comp. Exam. 5 | Comp. Exam. 6 | Comp. Exam. 7 |
|---|---|---|---|
| Monomeric phenol (%) | 2.5 | 1.2 | 0.5 |
| Dimeric phenol (%) | 9.4 | 11.2 | 26.4 |
| Softening point (° C.) | 115 | 106.8 | 68.4 |
| Yield (%/P) | 103 | 97 | 75 |

Example 12

Phenolic novolak (SP610 produced by ASAHI ORGANIC CHEMICALS INDUSTRY CO., LTD.) 100 g was dissolved, the novolak resin produced in Example 9 was dissolved in 5 g for mixing, and γ-aminopropyltriethoxysilane 1 g was added to obtain a resin composition.

Then, flattery sand 5000 g which was preheated to approximately 140 to 150° C. and the above-described resin composition 75 g were charged in a laboratory speed mixer and kneaded for 50 seconds. Hexamethylenetetramine 11.3 g which was previously dissolved in 75 g of cold water was totally added to the kneaded result, and the produced bulk substance was cooled by blowing air until it is broken into particles. Then, calcium stearate 5 g was added to the particles and mixed for 15 seconds to obtain resin-coated sand (hereinafter abbreviated as "RCS"). The properties of the obtained RCS were measured by the following testing method. The results are shown in Table 5.

(4) Bending Strength (N/cm$^2$)

Bending strength was measured according to JIS K-6910 (test piece calcining conditions: 250° C., 60 seconds).

(5) Amount of Produced Rosin (mg)

A test piece (10 mm×10 mm×60 mm) for measurement of bending strength was placed in a glass test tube (an inside diameter of 16 mm, a length of 180 mm), and glass wool (0.180 mg) previously weighed was inserted into the opening of the test tube. Then, the above-described measuring device was placed into a tubular heating furnace of which inner temperature was kept at 600° C., subjected to a heat exposure treatment for six minutes, and left standing for cooling down to normal temperature. Then, the glass wool was measured for its mass. The mass of the glass wool before the exposure to heat was subtracted from the mass of the glass wool undergone the exposure to heat to calculate an amount of produced rosin.

Comparative Examples 8, 9

Resin compositions and RCS were obtained in the same way as in Example 12 except that blending of the resin compositions was changed as shown in Table 4, and the measurement was conducted in the same way. The results are shown in Table 5.

TABLE 5

|  |  |  | Exam. 12 | Comp. Exam. 8 | Comp. Exam. 9 |
|---|---|---|---|---|---|
| Resin composition | Blending (Mass standard) | Phenolic novolak (SP610) | 100 | 100 | 100 |
|  |  | Novolak resin of Example 9 | 5 | — | — |
|  |  | Ethylenebisstearamide | — | 2 | — |
|  |  | γ-aminopropyltriethoxy silane | 1 | 1 | 1 |
| RCS | Blending (Mass standard) | Flattery sand | 100 | 100 | 100 |
|  |  | Resin composition | 1.5 | 1.5 | 1.5 |
|  |  | Hexamethylenetetramine | 0.225 | 0.225 | 0.225 |
|  | Properties | Bending strength (N/cm$^2$) | 525 | 520 | 400 |
|  |  | Amount of produced rosin (mg) | 2.9 | 3.7 | 3.0 |

It is apparent from Table 5 that the second novolak resin of the invention is very useful because it can suppress the production of rosin and improve the mold strength as compared with an activator such as ethylenebisstearamide which is used for general purpose as a modifier for conventional molding materials.

INDUSTRIAL APPLICABILITY

The first novolak resin of the invention can improve the problems such as contamination of the work environment and degradation in production efficiency in the photoresist field because the monomeric phenol is very little and the dimeric phenol is also decreased considerably as compared with the conventional resins.

The cured material can improve heat resistance, mechanical strength and the like without degrading the formability, flowability and the like because it develops the same crosslinking density as that of a conventional high-molecular weight resin and also substantially the same melt viscosity as that of a conventional low-molecular weight resin.

Therefore, it is useful as, for example, a base resin for epoxy resins, a curing agent for epoxy resins, and also as an environmental responsive binder for IC sealers, laminated plates, casting materials, forming materials and the like.

The second phenolic novolak of the invention has a very small amount of monomeric phenol as compared with a conventional resin, so that it can improve the problems such as the contamination of work environment and the production efficiency. And, the molecular weight distribution is narrow and the melt viscosity is low, so that it is suitably used as, for example, a base resin for epoxy resins and a curing agent for epoxy resins and also as a binder for laminated plates, casting materials, forming materials and the like.

According to the process for production of the present invention, the first and second novolak resins of the invention can be obtained in high yield, and the production cost can be reduced substantially.

The invention claimed is:

1. A process for production of phenolic novolak, comprising:
   conducting a heterogeneous reaction of a phenol and 0.40 mol to 0.93 mol of an aldehyde per mol of the phenol in the presence of 25 parts by mass or more of a phosphoric acid per 100 parts by mass of the phenol.

2. The process for production of phenolic novolak according to claim 1, wherein the compounding amount of the aldehyde is 0.80 mol or more and 0.93 mol or less per mol of the phenol.

3. The process for production of phenolic novolak according to claim 1, wherein the compounding amount of the aldehyde is 0.40 mol or more and less than 0.80 mol per mol of the phenol.

* * * * *